J. A. FRIDGEN.
FRICTION CLUTCH.
APPLICATION FILED MAY 28, 1910.
975,226.
Patented Nov. 8, 1910.
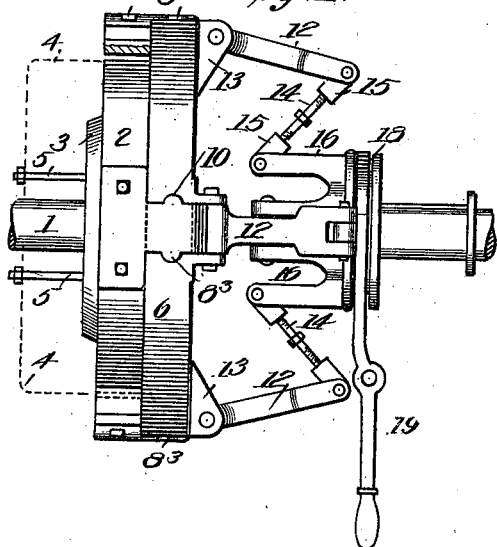
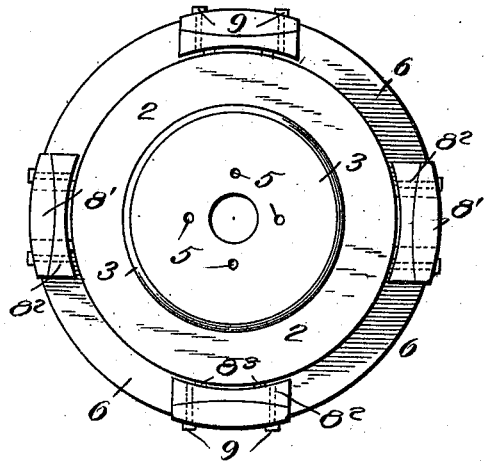
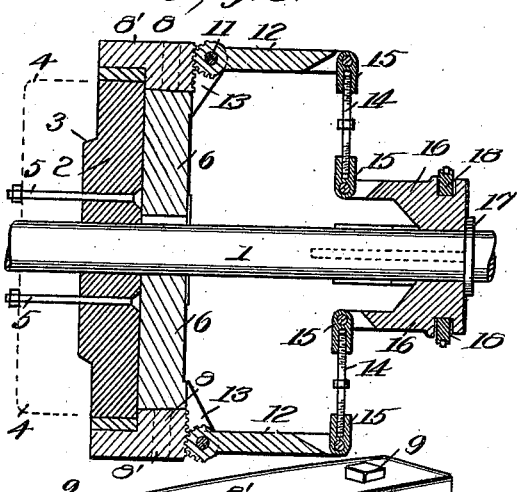
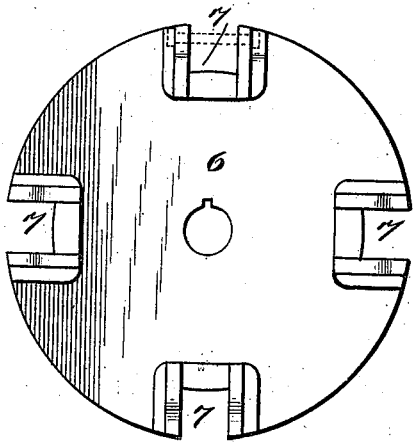
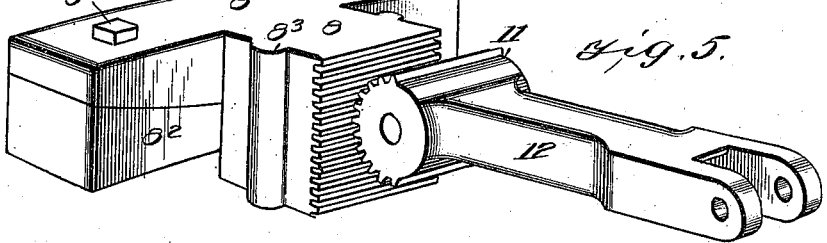
WITNESSES:
INVENTOR
JOHN A. FRIDGEN
BY
ATTORNEYS

UNITED STATES PATENT OFFICE.

JOHN A. FRIDGEN, OF LEAF MOUNTAIN, MINNESOTA.

FRICTION-CLUTCH.

975,226.  Specification of Letters Patent.  Patented Nov. 8, 1910.

Application filed May 23, 1910. Serial No. 563,986.

*To all whom it may concern:*

Be it known that I, JOHN A. FRIDGEN, a citizen of the United States, and a resident of Leaf Mountain, in the county of Ottertail and State of Minnesota, have invented certain Improvements in Friction-Clutches, of which the following is a specification.

My invention is an improvement in friction clutches of that type in which friction blocks or so-called shoes are arranged to bear on to the periphery of a disk keyed on a rotary shaft, the said shoes being adjusted into or out of contact with the disk by means of pivoted levers which are adjustably connected with a sleeve that is slidable on the shaft.

My invention is embodied in the novel features hereinafter described and more particularly specified in the claims.

In the accompanying drawing Figure 1 is a side elevation of my improvement. Fig. 2 is a face view of the same. Fig. 3 is a central longitudinal section. Fig. 4 is a face view of the pulley- or sprocket-wheel carrier which is keyed to the rotatable shaft. Fig. 5 is a perspective view of one of the shoes and the segmental lever for adjusting it.

Upon a rotatable shaft 1 there is mounted loosely a disk 2 which is provided on its outer side with a circular concentric beveled shoulder 3. A band pulley or sprocket wheel, indicated by dotted lines 4, is in practice secured to such carrier 2 by means of bolts 5 whose heads are countersunk in the inner side of the carrier. Alongside said disk and pulley carrier a circular head or disk 6 is keyed on the shaft and its periphery is provided, as shown in Fig. 4, with a series of radial notches or slots 7 in which the shanks 8 of the shoes 8' are arranged. As shown in Fig. 5, the shoes are practically T-shaped, and the elongated head of the same is provided with a wear piece $8^2$ which is secured by bolts 9. The opposite sides of the shanks 8 are provided with vertical ribs $8^3$ which are fitted in corresponding grooves 10—see Fig. 1—formed in the sides of the slots 7 of the disk 6.

The inner ends of the shanks 8 are toothed and segmental and are engaged by the toothed segmental heads 11 of levers 12. The latter are pivoted in lugs 13 projecting from the periphery of the head of the shoe-carrier 6. The outer ends of the levers 12 are connected by means of a screw 14 and pivoted sockets 15 with the slotted arms of a sleeve 16 that is slidable on a feathered portion of the shaft 1. The outward or sliding movement of this sleeve is limited by a collar 17 secured on the shaft. The sleeve is provided with a circumferential groove adapted to receive a collar 18 to which the prongs of a pivoted hand lever 19 are applied.

It will now be apparent that by adjusting the hand lever 19, the sleeve may be thrown inward toward the shoe carrier 6, as shown in Fig. 1, whereby the levers 12 will be adjusted inward at an angle and the shoes will be slid outward correspondingly, or, in other words, moved out of contact with the pulley carrier 2, as indicated in Fig. 2. On the other hand, when the sleeve 16 is adjusted into contact with the shaft collar 17, the shoes will be moved inward and their heads brought into frictional contact with the pulley carrier 2, whereby the latter will be rotated with the shoe carrier and shaft.

It will be seen that by means of the straight ribs $8^3$ with which the shanks of the shoes are provided, the latter are guided radially or in straight lines inward or outward when adjusted by the means described, and thus when the shoe is moved inward, its entire face is brought simultaneously in contact with the periphery of the pulley carrier to whose grooved periphery its shape conforms.

The aforesaid screws 14 are provided centrally with a polygonal collar by which they may be adjusted for lessening or increasing the distance between the pivoted sockets 15, whereby compensation may be made at any time for the wear of the shoes. It is obviously necessary that the opposite ends of the screws 14 shall be threaded in opposite directions.

What I claim is:—

1. In a friction clutch of the type indicated, the combination with a shaft and a pulley carrier mounted loosely thereon, of a disk keyed adjacently on the shaft and provided with radial slots in its periphery, shoes arranged in said slots and projecting over the pulley carrier and provided with radial guides for the shoes, and adjusting devices for moving the shoes inward and outward in the guide slots, substantially as described.

2. In a friction clutch of the type indicated, the combination with a shaft and pulley carrier loose thereon, of a disk keyed on the shaft and provided with slots having radial grooves in their opposite sides, shoes projecting over the pulley carrier and having shanks which are toothed on their inner ends and provided laterally with straight ribs adapted to slide in the aforesaid grooves, levers pivoted to the shoe carrier and having toothed segmental heads engaging the shoe shanks, a sleeve which is slidable on the shaft and rotatable therewith and provided with inwardly projecting arms, and screws and screw sockets adjustably connecting the sleeve with the aforesaid levers, substantially as described.

J. A. FRIDGEN.

Witnesses:
 FRANK FRESKE,
 JOHN A. WOIDOR.